United States Patent [19]
Friberg et al.
[11] 3,872,399
[45] Mar. 18, 1975

[54] MODULAR L-C FILTER

[75] Inventors: Vincent P. Friberg, Longmeadow, Mass.; John Chesney, Roselle Park, N.J.
[73] Assignee: General Instrument Corporation, Clifton, N.J.

[22] Filed: Apr. 12, 1974
[21] Appl. No.: 460,274

[52] U.S. Cl. .............................. 333/70 S, 333/70 R
[51] Int. Cl. .......................... H03h 7/02, H03h 7/08
[58] Field of Search ............ 333/70 R, 11, 70 S, 29, 333/24, 32, 77–79; 336/69, 229

[56] References Cited
UNITED STATES PATENTS

| | | | |
|---|---|---|---|
| 2,892,162 | 6/1959 | Bennett | 333/79 X |
| 3,555,466 | 1/1971 | Bernstein | 333/76 |

*Primary Examiner*—Eli Lieberman
*Assistant Examiner*—Marvin Nussbaum

[57] ABSTRACT

A filter includes a plurality of electrically connected modular L-C circuits. Each of the L-C circuits comprises a core in the shape of a toroid around which a conductor is wound a given number of times to define a winding. A capacitor is provided physically situated within the opening associated with the core and electrically connected to the conductor to form a portion of one of the turns of the core winding. The capacitor is so electrically connected to the conductor and so physically oriented relative to the core that current flowing through the turn which is partially formed by the capacitor induces a magnetic field in the core in the same sense as current flowing through the conductor.

7 Claims, 4 Drawing Figures

MODULAR L-C FILTER

The present invention relates to filter circuits and more particularly to a filter comprised of a plurality of modular L-C circuits in which the capacitor is electrically connected to form a turn of the inductor winding thereby enhancing the properties of the circuit and at the same time is physically situated to reduce the size thereof.

Electrical filters are well known in the art and are used in a vast number of different application in the electronics and related industries. These filters take a variety of forms but basically are constructed of one or more circuits, preferably in modular form, each of which contains an inductor and a capacitor which are electrically connected such that the filter acts to permit certain frequencies to pass through it while attenuating other frequencies.

The size of the modular L-C circuits which make up the filter is important particularly in view of the recent trend of subminiaturization of electrical components. It is therefore extremely desirable that the filters be of minimum size and still be easily assembled and accurately tunable. However, inductors and capacitors depend at least partially on physical size for their electrical characteristics. Thus, there is a practical minimum to the size that these components must have to demonstrate the desired electrical characteristics.

It is, therefore, a prime object of the present invention to provide a modular L-C filter wherein the L-C circuit modules are of reduced size due to the physical location and electrical connection of the capacitor relative to the inductor.

It is another object of the present invention to provide a modular L-C filter wherein the capacitor is electrically and physically located relative to the inductor so as to enhance the inductance of the inductor.

In accordance with the present invention, a modular L-C filter is provided comprising one or more L-C circuit modules each of which includes an inductor formed of a core in the shape of a toroid around which a conductor is wound a given number of turns to define a winding. The module also includes a capacitor which is physically situated within the opening associated with the core and electrically connected to the conductor to form a portion of a turn of the winding. The capacitor is electrically connected to the conductor and physically oriented relative to the core such that the current flowing through the turn partially formed by the capacitor induces a magnetic field in the core in the same sense as the current flowing through the conductor.

The physical placement of the capacitor within the opening in the toroid core reduces the size of the module. Further, since the capacitor forms a portion of a turn of the winding it enhances the inductance of the coil. Moreover, the utilization of the capacitor as a portion of the turn causes a small increase in the Q value of the coil over the conventional type of winding wherein the turns are made exclusively of the conductor, and the capacitor and the inductor are physically and electrically separated.

The filters of the present invention, because of their modular character, demonstrate a considerable degree of design flexibility in that as many modules as are necessary for a particular application may be included in the filter. Further, these filters are in the single frequency category and may be compensated to demonstrate nominally zero drift. In addition, impedance matching may be achieved by virtue of the frequency response characteristics demonstrated by the filter.

To the accomplishment of the above, and to such other objects as may hereinafter appear, the present invention relates to a modular L-C filter as defined in the appended claims and as described in the specification, taken together with the accompanying drawings wherein like numerals refer to like parts and in which:

Figure 4:
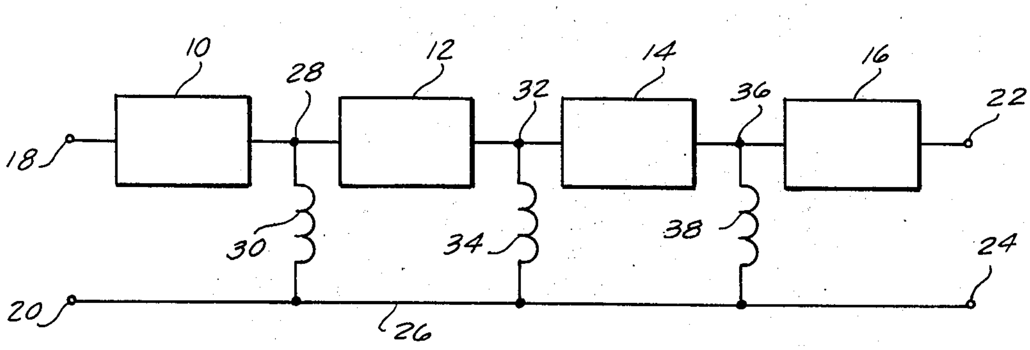
FIG. 4 is a block diagram of a preferred embodiment of the filter of the present invention.

Referring first to FIG. 4, the modular L-C filter of the present invention is comprised of a plurality of L-C circuit modules 10, 12, 14, and 16 which are electrically connected to form the filter. The filter has a pair of input terminals 18 and 20, and a pair of output terminals 22, 24. Each adjacent pair of modules is electrically connected through a node which in turn is connected through a small inductor to a conductor 26 which provides a common path to ground. As can be seen in this drawing, modules 10 and 12 are connected through node 28 which in turn is connected to conductor 26 through inductor 30. Modules 12 and 14 are connected through node 32 which in turn is connected to conductor 26 through inductor 34. In a similar fashion, modules 14 and 16 are connected through node 36 which in turn is connected to conductor 26 through inductor 38. Preferably, inductors 30, 34 and 38 are situated upon the printed circuit board to which the modules are mounted. The modules themselves are preferably wired to provide low side inductive coupling.

Figure 1:
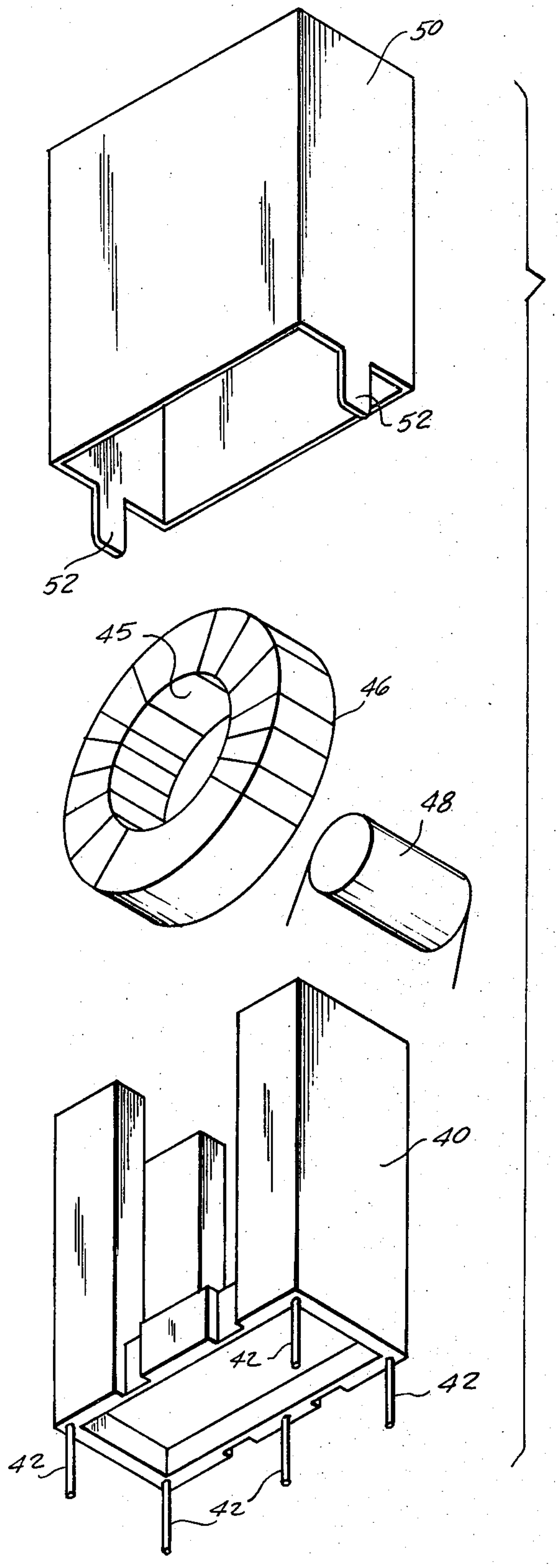
FIG. 1 is an exploded isometric view of a preferred embodiment of a module of the present invention.
Figure 2:
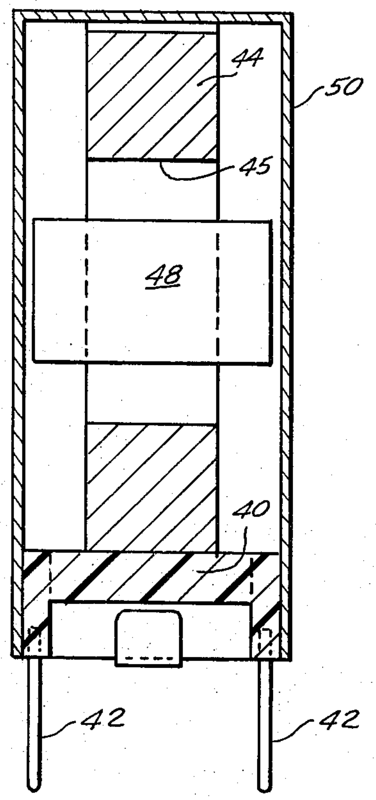
FIG. 2 is a side cross-sectional view of a preferred embodiment of a module of the present invention.
Figure 3:
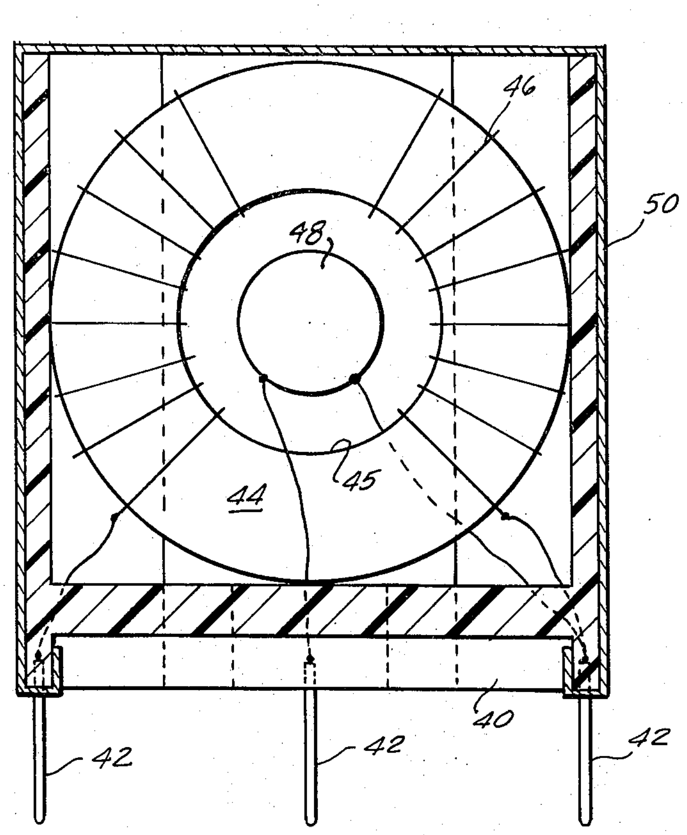
FIG. 3 is a front cutaway view of the preferred embodiment of a module of the present invention.

The modules themselves, as illustrated in FIGS. 1, 2 and 3, consist of a base 40 having a number of terminal pins 42 extending through the bottom surface thereof. The printed circuit board to which the module is mounted will be provided with a plurality of terminal-accepting structures to permit the module to be mounted and demounted from the circuit board in the conventional fashion.

Mounted within base 40 is a toroidal-shaped core 44 around which a conductor 46 has been wound. The turns of conductor 46 will all be in the same direction relative to core 44 such that the current flowing through conductor 46 induces a magnetic field in core 44 in a particular sense. A capacitor 48, preferably of the tubular type (although other types of capacitors, such as film type capacitors, may also be used), is physically situated within the opening 45 in toroidal-shaped coil 44 and connected to conductor 46 such as to form a portion of one of the turns of the winding. The physical orientation and electrical connection of capacitor 48 is such that the current flowing through capacitor 48 induces a magnetic field in core 44 in the same sense as the magnetic field induced in core 44 by conductor 46. This is perhaps best illustrated in FIG. 3 where the terminal connections are shown. The flow of current in the conductor relative to the core will be in the same direction as the flow of current through the capacitor relative to the core. Therefore, the magnetic fields induced in the core by the conductor and capacitor respectively will act together to enhance the inductance and Q value of the inductor.

A conventional tubular capacitor comprises an inner plate and an outer plate. When this type of capacitor is used, it is preferable to connect the outer plate of the tubular capacitor to the high impedance end of the inductor. Which end of the inductor is the high impedance is determined by circuit connections. In this method of connection, the inner plate which is formed around the edge of the tubular dielectric material will be closest to the shielding cover placed over the inductor-capacitor assembly. Since the inner plate will be connected to the low impedance end of the coil, this will minimize the capacitance between the high impedance end of the L-C circuit and the normally grounded shielding cover. This improves stability by reducing resonant frequency variations in the event of relative movement between the capacitor and shielding cover such as by mechanical vibrations or the like.

The assembly of the module is completed by mounting shielding cover 50 on base 40 by means of tabs 52 which are bent perpendicular to the sides of tuning member 50 on the bottom of base 40 to provide the necessary connection and physical stability.

It is preferable, prior to assembly of the module, to test the inductor in a resonant frequency fixture to determine the frequency category thereof. The Q or quality of the inductor may also be determined in this test. Such tests are necessary because there will be a variation in resonant frequency caused by variations in core material, core dimensions, distributed capacity, winding tightness and wire dimensions. Similarly, the capacitors will be measured and placed into categories. In a particular module, a categorized inductor will be connected with a measured capacitor in order to provide a module having a resonant frequency somewhat lower in value than the actual final operating frequency.

Prior to the installation of the shielding cover on the base, the assembly is placed in a resonant frequency test fixture which simulates part of the final filter. A test shielding cover is placed over the assembly. This test shielding cover is specially designed to have an adjustment opening aligned with a portion of the core where the conductor is not present. The assembly may now be adjusted to a predetermined frequency by removing some of the core material, such as by grinding, scraping, or drilling. The resonant frequency of the assembly will increase as the core material is removed and can be continuously monitored while the assembly is on the resonant frequency test fixture by observing an oscilloscope electrically connected thereto.

This method is the subject of another patent application, Ser. No. 463,579, filed Apr. 24, 1974, and entitled "Method and Apparatus for Calibrating a Resonant Frequency Circuit," assigned to the assignee of this application.

After each of the assemblies has been tested in this way and the proper resonant frequency for each has been achieved, the shielding cover 50 is placed on the assembly and the completed prealigned modules are mounted on the circuit board to form the filter. Preferably, as can be seen in FIGS. 1 and 2, the bottom of base 40 has a recessed portion adapted to accept the connecting coils on the circuit board when the module is mounted on the circuit board. In this way, the circuit board may be of reduced size. The filter complexity, i.e., the number of modules which go to make up the filter is determined by the particular application for which the filter is to be used.

The assembled filter is then tested in a test fixture for insertion loss, bandwidth and resonant frequency characteristics. Normally, no adjustments are necessary because each module is prealigned and the shielding covers 50 eliminate interaction problems between adjacent modules when the filter is assembled.

Through the proper physical orientation and electrical connection of the capacitor relative to the inductor, the present invention provides a filter assembly of reduced size with enhanced electrical and mechanical stability. By electrically pretesting each module economy is achieved through high yield.

While a single preferred embodiment of the present invention has been specifically disclosed herein for purposes of illustration, it is apparent that many modifications and variations may be made thereon. It is intended to cover all of these variations and modifications which fall within the scope of this invention as defined by the appended claims.

We claim:

1. An L-C circuit comprising a core in the shape of a toroid substantially surrounding an opening, a conductor, said conductor being wound around said core a given number of turns to define a winding, and a capacitor physically situated within the opening associated with said core and electrically connected to said conductor to form a portion of a turn around said core.

2. The circuit of claim 1 wherein said capacitor is so electrically connected to said conductor and so physically oriented relative to said core that current flowing through said turn partially formed by said capacitor induces a magnetic field in said core in the same sense as current flowing through said conductor.

3. An L-C circuit comprising a core in the shape of a toroid substantially surrounding an opening, a conductor having first and second ends, said conductor being wound around said core a given number of turns in a given direction to form an inductor such that current flows therethrough in a given direction, a capacitor physically situated within the opening associated with said core and comprising two plates each with its representative lead connected thereto, one lead of said capacitor and said first end of said conductor being electrically connected together to one side of said core, the other lead of said capacitor being located to the other side of said core whereby said capacitor will form an additional turn of said conductor.

4. The circuit of claim 3 further comprising a base upon which said core is mounted, and first, second and third terminals also mounted on said core, said first end being electrically connected to said first terminal and said second end and said other lead being electrically connected to said second and said third terminals, respectively.

5. The circuit of claim 4 wherein one of said terminals is operably connected to ground and wherein said capacitor is a tubular capacitor having an inner plate and an outer plate, said inner plate being connected to said grounded terminal.

6. The circuit of claim 4 further comprising an external circuit having a high impedance end and a low impedance end and means for electrically connecting said outer plate to said high impedance end.

7. A filter assembly comprising at least two L-C circuits each of which comprises a core in the shape of a toroid substantially surrounding an opening, a conductor, said conductor being wound around said core a given number of turns in a given direction to define a winding and a capacitor physically situated within the opening associated with said core and electrically connected to said conductor to form a portion of a turn around said core, said circuits being operably connected together through a node, said node being connected to ground through an inductor.

* * * * *